Dec. 25, 1956 V. BULECKI 2,775,034
SEAM OPENER
Filed Nov. 18. 1955
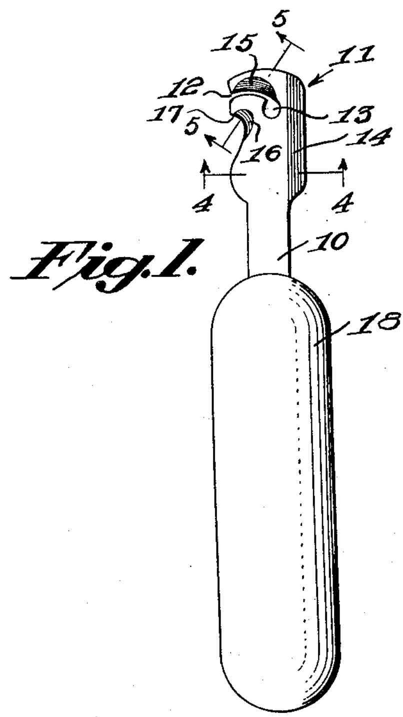
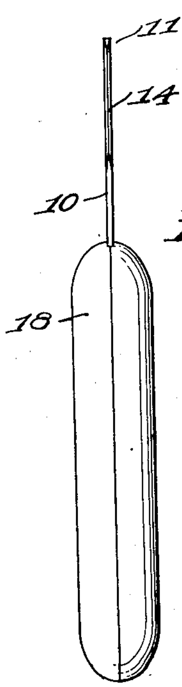
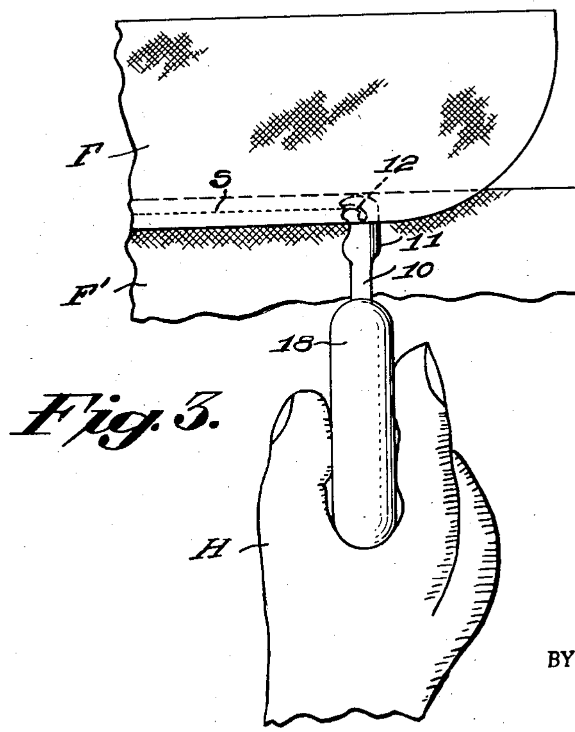
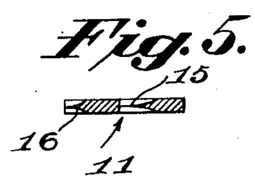
INVENTOR
Victor Bulecki.
BY Robert [signature]
ATTORNEY United States Patent Office 2,775,034

Patented Dec. 25, 1956

2,775,034

SEAM OPENER

Victor Bulecki, Toronto, Ontario, Canada

Application November 18, 1955, Serial No. 547,721

1 Claim. (Cl. 30—294)

This invention relates to a seam opener.

The invention is more particularly concerned with a seam opener, or a device for cutting stitch threads disposed intermediate two plies of fabric which are stitched together.

While devices of this general character have heretofore been provided and proposed, present methods of opening seams generally comprise the use of knives, scalpels, razor blades and the like. This makeshift method of seam opening is slow and in the absence of great care damage occurs both to the stitched fabric and to the hands of a person exercising such method.

It is accordingly a primary object of the present invention to provide a seam opener of relatively simple construction by which seams may be opened rapidly without danger of damage to the stitched fabric or injury to the hands of a person using same.

A further object of the invention is to provide a seam opener or stitch cutting device having a plurality of cutting edges whereby same is adapted for cutting threads under different circumstances as well as for cutting thread and fabric in general.

Other objects and advantages of the invention will become apparent in the course of the following detailed description, taken in connection with the accompanying drawing, wherein—

Fig. 1 is a side elevational view of the device in accordance with a preferred structural embodiment thereof, and wherein same is shown on a substantially enlarged scale.

Fig. 2 is an edge elevational view of the device as observed from the right of Fig. 1.

Fig. 3 is a plan view showing fragments of two superposed pieces of fabric stitched together and also showing the improved thread cutting device on substantially actual scale in use in the cutting of the threads in the stitch.

Fig. 4 is an enlarged sectional view as observed in the plane of line 4—4 on Fig. 1.

Fig. 5 is an enlarged sectional view as observed in the plane of line 5—5 on Fig. 1.

Referring now in detail to the drawing the seam opener comprises a shank 10 and a head 11 which, except for the cutting edges, later referred to, are in the form of a relatively thin plate of uniform thickness, thereby adapting same for ready insertion between two superposed plies of fabric.

The head 11 is provided with an arcuate slot 12 terminating in an opening 13 intermediate the edges of the head and said slot opens through one edge of the head.

The opposite edge of the head is provided with a relatively long cutting edge 14. A second cutting edge 15 is provided in line with the outer edge of the slot 12 and a third cutting edge 16 is provided in a recessed portion 17 of the head beneath the said slot.

The said shank 10 may be held by any suitable means for manipulation thereof in cutting operations but same is preferably mounted in a suitable handle 18.

The improved thread cutting device is in no way dependent upon any particular mounting of the shank 10 in the handle 18 which provides hand engageable means for easy and accurate operation of the cutting edged head.

The improved device is illustrated in use in Fig. 3 wherein two superposed plies of fabric F, F′, are connected by a seam or line of stitches 5.

In the cutting of such stitches in a seam opening operation, the head 11 is inserted between the fabric plies with the mouth of the slot 12 in line with the seam, with the head held in such position by the hand H of an operator, the successive stitches will enter the said slot 12 and engage the cutting edge 15 whereby same will be cut.

The said head 11 may be positioned with the cutting edge 16 disposed in line with the stitches or said cutting edge may be used in thread cutting operations under other circumstances. The cutting edge 14 may well be used to cut the threads in several lines of stitching, all in one operation, or such cutting edge may be used under various circumstances.

In the use of any of the described cutting edges, same will be held out of contact with the fabric by the opposite parallel sides of the head 11.

It is to be particularly observed that the thread receiving slot 12 extends generally transversely of the head 11 with its center of curvature disposed at a point toward said shank 10 and that the slot opens through one edge of the head and communicates with a thread clearance opening 13 disposed intermediate the opposite side edges of the head. Furthermore, the slot is relatively narrow to admit threads only with no possibility of cutting the fabric in which the threads to be cut are disposed.

The curvature of the slot 12 with the cutting edge 15 being concave, the threads are easily cut by drawing the head along by means of the handle as is illustrated in Fig. 3.

While I have disclosed my invention in accordance with a single specific structural embodiment thereof, such is to be considered as illustrative only, and not restrictive, the scope of the invention being defined in the subjoined claim.

What I claim and desire to secure by U. S. Letters Patent is:

A seam opener comprising a relatively thin plate including an elongated shank and a generally rectangular head, a narrow thread receiving slot in said head disposed generally transversely of said head, said slot being arcuately curved outwardly and presenting curved edges, a cut-thread clearance opening in said head intermediate the opposite side edges thereof, said slot having one end thereof opening through one side edge of the head and the other end thereof communicating with said clearance opening and the outer curved edge of said slot having a sharpened cutting edge.

References Cited in the file of this patent

UNITED STATES PATENTS

| | | |
|---|---|---|
| 334,724 | Ruekstuhl | Jan. 19, 1886 |
| 936,474 | Post | Oct. 12, 1909 |
| 1,445,667 | Dearholt | Feb. 20, 1923 |
| 2,696,621 | Miller | Dec. 14, 1954 |